United States Patent Office 3,479,402
Patented Nov. 18, 1969

3,479,402
PREPARATION OF [(2-METHYLENEALKANOYL) PHENOXY]ALKANOIC ACIDS
Edward J. Cragoe, Jr., Lansdale, Pa., assignor to Merck & Co., Inc., Rahway, N.J., a corporation of New Jersey
No Drawing. Filed Jan. 14, 1966, Ser. No. 520,670
Int. Cl. C07c 65/02, 43/20, 49/76
U.S. Cl. 260—520                                13 Claims

ABSTRACT OF THE DISCLOSURE

A method for the preparation of [(2-methylenealkanoyl)phenoxy]alkanoic acid products and the salts, esters and amide derivatives thereof. The products are prepared by treating a [[2-(organothiomethyl)alkanoyl]-phenoxy]alkanoic acid under basic conditions with a reagent which is capable of eliminating an organomercaptan radical therefrom as, for example, with mercuric oxide, lead oxide or silver nitrate. Said products are diuretic and saluretic agents which can be used in the treatment of edema and hypertension.

---

This invention relates to a new method for the preparation of [(2-methylenealkanoyl)phenoxy]alkanoic acids having valuable pharmacological activity.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, mobilize accumulated fluids in the tissues and, in general, alleviate conditions usually associated with edema.

Broadly stated, the instant process consists in treating a [[2-(organothiomethyl)alkanoyl]phenoxy]alkanoic acid (II, infra) under basic conditions with a reagent which is capable of eliminating an organomercaptan therefrom, followed by the treatment of the carboxylate salt intermediate thus formed with an acid to obtain the desired [(2 - methylenealkanoyl)phenoxy]alkanoic acid product (I, infra). The following equation illustrates the reaction:

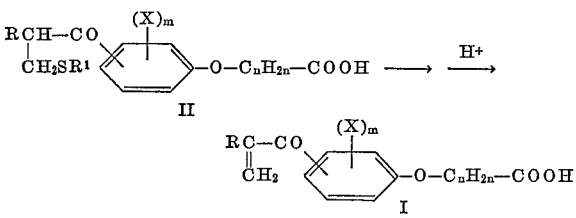

wherein R is a member selected from the group consisting of hydrogen, alkyl, trihalomethyl substituted lower alkyl, cycloalkyl, for example, mononuclear cycloalkyl containing from five to six nuclear carbon atoms such as cyclopentyl, cyclohexyl, etc., alkylcycloalkyl, for example, mononuclear alkylcycloalkyl containing from five to six nuclear carbon atoms such as 4-methylcyclohexyl, etc. and mononuclear aryl; $R^1$ is a member selected from the group consisting of alkyl, hydroxyalkyl, mercapto substituted hydroxyalkyl, haloalkyl, polyhaloalkyl, carboxyalkyl, alkoxycarbonylalkyl, alkanamido substituted carboxyalkyl, aminoalkyl, amino substituted carboxyalkyl, aralkyl such as phenylalkyl, alkenyl, cycloalkyl, aryl, carboxyphenyl, alkanoyl, benzoyl, 2-(gamma-L-glutamylamino)-2-(N - carboxymethylcarbamoyl) - alkyl and carboxymethoxybenzoylalkyl wherein the benzene ring may be unsubstituted or substituted by one to four X substituents wherein X is as defined hereinbelow; the X radicals are similar or dissimilar members selected from the group consisting of hydrogen, halogen, trihalomethyl, lower alkyl, lower alkoxy and, when substituted on adjacent carbon atoms of the benzene ring, two X radicals may be combined to form an hydrocarbylene chain containing from three to four carbon atoms between their points of attachment to the benzene nucleus, for example, trimethylene, tetramethylene, 1,3 - butadienylene, i.e., —CH=CH—CH=CH—, etc.; $m$ is an integer having a value of one to four; $n$ is an integer having a value of one to four and $H^+$ is the cation derived from a suitable organic or inorganic acid such as hydrochloric acid, etc.

In general, the conversion of the [[2-(organothiomethyl)alkanoyl]phenoxy]alkanoic acid (II) to the desired product (I) is effected in a weakly basic reaction medium by treating the former with a reagent which is capable of combining with mercaptans, followed by the reaction of the carboxylic acid salt intermediate thus formed with an acid, such as hydrochloric acid, to obtain the desired product. Suitable reagents having an affinity for mercaptans include, for example, metallic oxides and metallic nitrates such as mercuric oxide, lead oxide, silver nitrate, etc. The reaction may be conducted in an aqueous medium or, alternatively, in a suitable organic solvent; however, the choice of a particular solvent is not critical to the success of the process and, in general, any organic or inorganic reaction medium which is substantially inert and in which the reactants are reasonably soluble may be employed.

The [(2-methylenealkanoyl)phenoxy]alkanoic acids (I) prepared according to the instant process are generally obtained as crystalline solids and, if desired, may be purified by recrystallization from a suitable solvent. Suitable solvents include, for example, carbon tetrachloride, butyl chloride, benzene, cyclohexane, etc., or mixtures thereof.

A preferred embodiment of this invention consists in the reaction of a weakly basic solution of a [4-[2-(organothiomethyl)alkanoyl]phenoxy]acetic acid (IIa, infra) with a reagent capable of combining with mercaptans, followed by treatment of the carboxylate salt intermediate thus formed with an acid to obtain the desired [4-(2-methylenealkanoyl)phenoxy]acetic acid (Ia). The following equation illustrates the process:

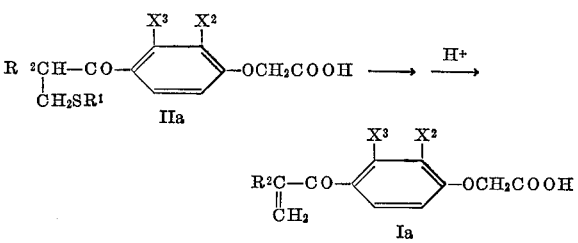

wherein $R^1$ and $H^+$ are as defined above; $R^2$ is a member selected from the group consisting of lower alkyl and trihalomethyl substituted lower alkyl; $X^2$ and $X^3$ each represent similar or dissimilar members selected from the group consisting of hydrogen, halogen, lower alkyl and, taken together, the $X^2$ and $X^3$ radicals may be joined to form a 1,3-butadienylene chain.

The foregoing class of compounds (Ia) exhibits particularly good diuretic and saluretic activity and represents a preferred subgroup of compounds within the scope of this invention.

The [[2 - (organothiomethyl)alkanoyl]phenoxy]alkanoic acids which are employed as starting materials in the process of this invention are conveniently prepared by the reaction of a [[2-(secondary-aminomethyl)alkanoyl]phenoxy]alkanoic acid or an acid addition salt thereof (III, infra) with either a mercaptan or hydrogen sulfide, or with the salts thereof, in the presence of a weak base. The following equation illustrates the reaction:

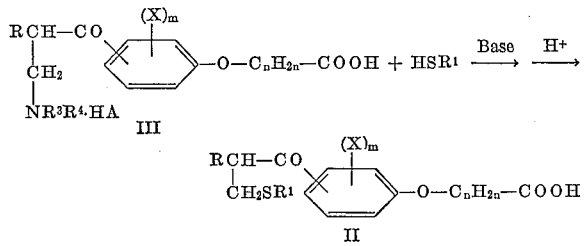

wherein R, R¹, X, $m$, $n$ and H⁺ are as defined above; R³ and R⁴ are hydrocarbyl radicals, i.e., organic radicals composed solely of carbon and hydrogen such as alkyl radicals or, taken together with the nitrogen atom to which they are attached, an heterocyclic radical such as piperidino, morpholino, etc. and HA is the moiety derived from an organic or inorganic acid capable of forming salts wtih amines, for example, hydrochloric acid, etc. In general, the reaction may be conducted at either ambient or elevated temperatures and in any solvent in which the reactants are reasonably soluble and which is substantially inert with respect to the reactants employed.

The [[2-(secondary-aminomethyl)alkanoyl]phenoxy]-alkanoic acids (III) and the salts thereof, which are employed as starting materials in the preparation of the [[2-(organothiomethyl)alkanoyl]-phenoxy]alkanoic acid precursors (II) are prepared by the reaction of an (alkanoylphenoxy)alkanoic acid (IV, infra) with formaldehyde or paraformaldehyde and the acid addition salt of a secondary amine as, for example, the acid addition salt of a dialkylamine, piperidine or morpholine, to yield the corresponding acid addition salt of [[2-(secondary-aminomethyl)alkanoyl]phenoxy]alkanoic acid (III) (i.e., a Mannich amine). The following equation illustrates this method of preparation:

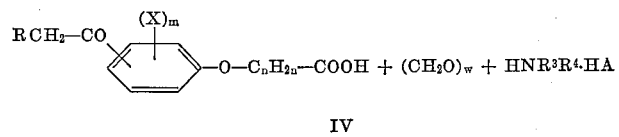

wherein R, R³, R⁴, X, $m$, $n$ and HA are as defined above; HNR³R⁴·HA represents the salt of a secondary amine such as an amine selected from the group consisting of a dialkylamine, for example, a di-lower alkylamine, piperidine, morpholine, etc. and $w$ is the integer one or a number greater than one. If desired, the Mannich amine salt thus obtained may be converted to the corresponding free amine in the conventional manner by treatment with a base. The preparation of the foregoing Mannich amine intermediates (III) is more fully described in copending U.S. patent application Ser. No. 237,288, filed Nov. 13, 1962.

The (alkanoylphenoxy)alkanoic acid reactants (IV) described above in connection with the preparation of the salts of the [[2 - (secondary - aminomethyl)alkanoyl]phenoxy]alkanoic acid intermediates (III) may be prepared by several methods. One method consists in the Friedel-Crafts reaction of an alkanoyl halide or a suitably substituted alkanoyl halide with an appropriate nuclear substituted or nuclear unsubstituted phenoxyalkanoic acid in the presence of a metallic halide to produce the corresponding (alkanoylphenoxy)alkanoic acid. As metallic halide catalysts, anhydrous aluminum chloride and boron trifluoride are particularly effective in promoting the Friedel-Crafts reaction. The reaction proceeds most favorably in carbon disulfide dichloromethane or petroleum ether solvents and with slight heating as, for example, at reflux temperatures by heating on a steam bath. When the benzene ring in the phenoxyalkanoic acid reactant is substituted by alkoxy, the Friedel-Crafts reaction results in a conversion of the alkoxy radical to a hydroxy group; however, the alkoxy moiety may be easily replaced by conventional means as, for example, by treating the nuclear hydroxy substituted phenoxyalkanoic acid with a dialkyl sulfate such as dimethyl sulfate to obtain the desired nuclear alkoxyphenoxyalkanoic acid compound.

The (alkanoylphenoxy)alkanoic acid reactants (IV) may also be prepared by an alternate route. According to this method a (nuclear hydroxy)alkanophenone (V, infra) is allowed to react with an appropriate halo substituted alkanoic acid or with an esterified derivative thereof, in the presence of a base, to obtain the corresponding (alkanoylphenoxy)alkanoic acid or corresponding alkanoic acid ester derivative and, when the ester derivative is obtained, hydrolyzing the said ester intermediate with an aqueous solution of a base such as an aqueous solution of sodium hydroxide, to generate the corresponding (alkanoylphenoxy)alkanoic acid (IV). The following equation, wherein the starting material employed is an haloalkanoic acid reactant, illustrates this method of preparation:

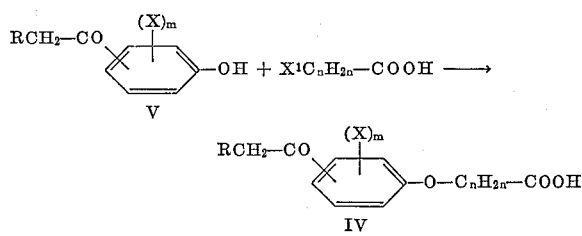

wherein R, X, $m$ and $n$ are as defined above and X¹ is halogen, for example, chlorine, bromine, etc. Suitable bases which may be employed in the process include, for example, sodium hydride in glyme (i.e., 1,2-dimethoxymethane), aqueous sodium hydroxide, sodium amide in benzene, sodium methoxide in methanol or potassium ethoxide in ethanol.

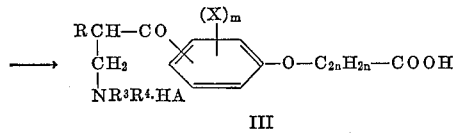

Another method for preparing the (alkanoylphenoxy)alkanoic acid reactants and one which is particularly applicable for the preparation of (4-alkanoylphenoxy)acetic acids (IVa, infra) consists in the oxidation of a (4-alkanoyl)allyloxybenzene. The following equation illustrates this method of preparation:

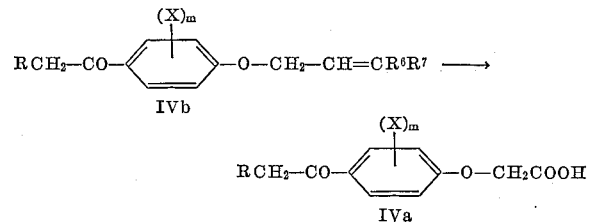

wherein R, X and $m$ are as defined above and R⁶ and R⁷ each represents similar of dissimilar substituents selected from the group consisting of hydrogen, lower alkyl, for example, methyl, ethyl, etc. and mononuclear aryl, for example, phenyl, p-tolyl, etc. In general, any reagent capable of converting the allyl group in the (4-alkanoyl) allyloxybenzene to carboxyl may be employed as an oxidizing agent in the process. Suitable reagents include, for example, potassium permanganate, chromium trioxide (i.e., chromic acid or chromic anhydride), sodium chromate, sodium dichromate, potassium dichromate, etc. Acetone is a particularly suitable solvent in which to conduct the reaction although one skilled in the art will readily perceive that any one of a wide variety of other organic solvents may also be employed.

The (4-alkanoyl)allyloxybenzene reactants (IVb) of the foregoing oxidation process are conveniently prepared by the reaction of an alkali metal salt of a 4-halophenol (IVc, infra) with an appropriate allyl halide, followed by the reaction of the 4-halophenyl allyl ether intermediate (IVd) thus formed with magnesium metal in an ether solution; the Grignard reagent thus produced is then treated with a suitable aldehyde such as an aldehyde of the formula $RCH_2CHO$ wherein R is as defined above, and the 4-(1-hydroxyalkyl)phenyl allyl ether compound (IVe) thus obtained is oxidized to produce the desired 4-alkanoylphenyl allyl ether compound (IVb). The reagents described above for the oxidation of the 4-alkanoylphenyl allyl ether compound (IVb) to the desired (4-alkanoylphenoxy)acetic acid (IVa) may also be employed in the instant oxidation step; however, the 4-(1-hydroxyalkyl)phenyl allyl ether compound (IVd) is preferably oxidized to the corresponding 4-alkanoylphenyl allyl ether (IVa) by conducting the oxidation reaction in the presence of a chromium trioxide or sodium chromate catalyst. The following equations illustrate this method of preparation:

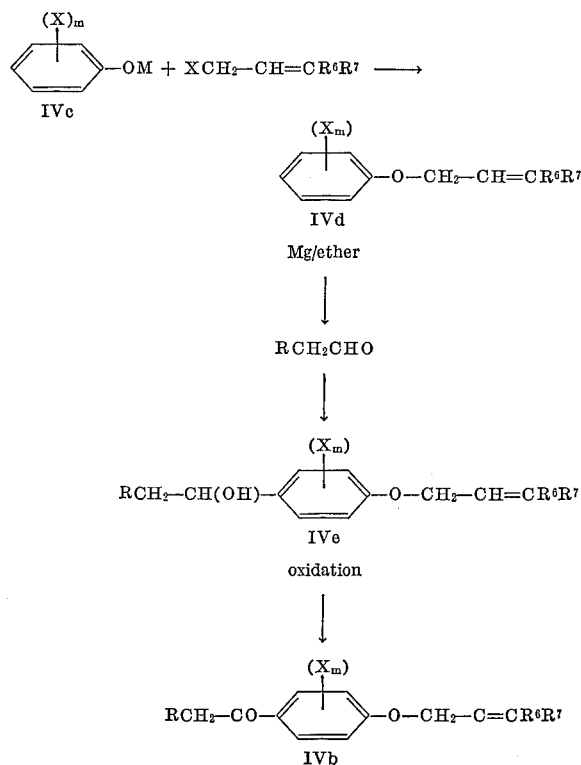

wherein R, $X$, $X^1$ and $m$ are as defined above.

The (nuclear hydroxy)alkanophenones (V) which are employed as reactants in the foregoing etherification reaction are either known compounds or may be conveniently prepared by known methods. One such method comprises treating an appropriate alkanoyl halide with a suitable nuclear substituted or nuclear unsubstituted anisole, phenetole or other equivalent ether (VI, infra) in the presence of aluminum chloride and in a suitable solvent such as carbon disulfide or dichloromethane and converting the (nuclear alkoxy)alkanophenone (Va, infra) thus obtained to the corresponding (nuclear hydroxy)alkanophenone (V) by treatment of the former with an additional amount of aluminum chloride and with the application of heat. This method of preparation is illustrated by the following equation:

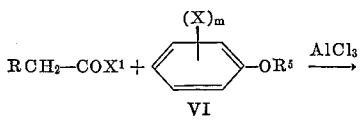

wherein R, X, $X^1$ and $m$ are as defined above and $R^5$ is lower alkyl, for example, methyl, ethyl, etc.

Still another method for preparing the (nuclear hydroxy)alkanophenones (V) consists in treating an appropriate phenol with an alkanoyl halide to produce the corresponding phenol ester, followed by the heating of the said ester thus formed with aluminum chloride to effect a nuclear rearrangement which results in the formation of the desired (nuclear hydroxy)alkanophenone. This method of preparation is particularly suitable for preparing the 2'-hydroxyalkanophenone reactants.

Another method for preparing the (nuclear hydroxy)alkanophenone starting materials (V) comprises the reaction of a suitable Grignard reagent, such as $RCH_2MgBr$ wherein R is as defined above, with the alkyl ether of an appropriate nuclear hydroxy substituted benzaldehyde (VII, infra), followed by the oxidation of the (nuclear alkoxy) substituted benzyl alcohol intermediate (VIII, infra) thus produced with sodium dichromate and cleavage of the ether group in the resulting (nuclear alkoxy) alkanophenone (IX, infra) by treatment with aluminum chloride. The following equation illustrates this method of preparation:

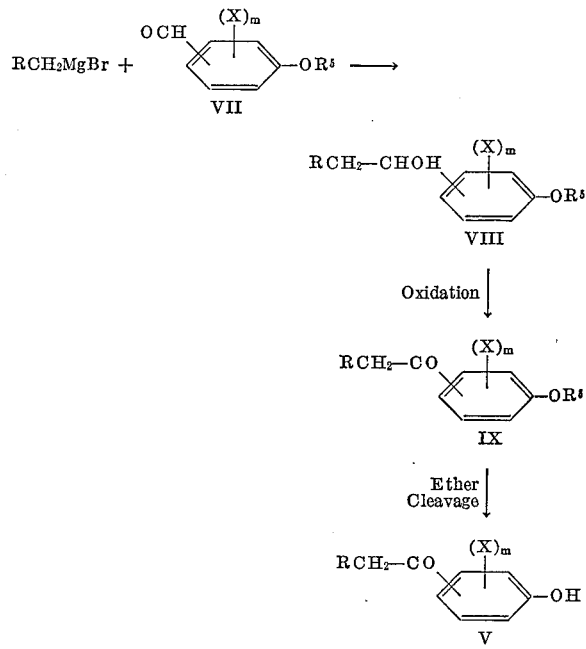

wherein R, $R^5$, X and $m$ are as defined above. The foregoing Grignard method may be used to prepare all of the isomeric-(nuclear hydroxy)alkanophenone reactants (V), i.e., the 2'-, the 3'- and the 4'-hydroxy substituted alkanophenones but, primarily, this method of preparation is particularly advantageous for preparing the 3'-hydroxyalkanophenone isomers. For example, a 3-formylanisole reacts with the appropriate Grignard reagents to produce the corresponding 3-methoxybenzyl alcohol and the said alcohol may then be oxidized to the corresponding (nuclear alkoxy)alkanophenone and the methyl ether group cleaved to produce the corresponding 3'-hydroxylkanophene compound.

Still another method for preparing the 3'-hydroxy-alkanophenone compounds (V) consists in nitrating an appropriate alkanophenone by conventional means as, for example, with fuming nitric acid to produce the corresponding 3'-nitroalkanophenone intermediate; reducing the said nitro derivative to its amine counterpart and then converting the amine derivative thus obtained to the desired 3'-hydroxyalkanophenone by known methods.

This invention also relates to the preparation of the acid addition salts, esters and amide derivatives of the instant products (I) and includes all such derivatives as are compatible with the body system and whose pharmacological properties will not cause an adverse physiological effect. Thus, in general, any base which will react with the foregoing [(2-methylenealkanoyl)phenoxy]alkanoic acids (I) and whose pharmacological properties will not cause an adverse effect is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, etc., nitrogen containng heterocyclic amines, for exiample, piperidine, etc. Esters and amides which are within the scope of this inventon include, for example, the alkyl esters such as the methyl, ethyl and propyl esters, etc. and the amide and monoalkyl and dialkylamide derivatives such as the N-methyl, N-ethyl and N-proply amide derivatives, etc., the N,N-dimethylamide, N,N-diethylamide derivatives etc.; which esters and amides are prepared in the conventional manner from the corresponding [(2-methylenealkanoyl)phenoxy]alkanoic acid product (I) or the acid halide derivative thereof by reaction of the latter with a suitable alcohol, ammonia or monoalkyl or dialkylamide.

The examples which follow illustrate the novel method of this invention for preparing [(2-methylenealkanoyl)-phenoxy]alkanoic acids (I). However, the examples are illustrative only and it will be apparent to one having ordinary skill in the art that all of the products embraced by Formula I, supra, may also be prepared in an analogous manner by substituting the appropriate starting materials for those set forth in the examples.

EXAMPLE 1

2,3-dichloro - 4 - (2 - methylenebutyryl)phenoxyacetic acid

*Step A:* 2,3-dichloroanisole.—A five-liter, four-neck, round-bottom flask is equipped with a stirrer, thermometer, reflux condenser and two dropping funnels. 2,3- dichlorophenol (400 g., 2.45 moles) and 10 N sodium hydroxide (245 ml., 2.45 moles) are added. The temperature rises to 55° C. The mixture is heated to 80–85° C. on a steam bath and 10 N sodium hydroxide (613 ml., 6.15 moles) is placed in one dropping funnel and dimethyl sulfate (814 ml., 1083 g., 8.58 moles) in the other. The base and dimethyl sulfate are then added simultaneously in a dropwise manner over 3½ hours with stirring. Heating and stirring are continued for one hour. The mixture then is cooled and water (2400 ml.) is added. The oil that separates soon solidifies. The solid is collected by filtration and dissolved in ether (1000 ml.) The filtrate is extracted with ether (600 ml.) and the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole, M.P. 32–33° C.

*Step B:* 2',3' - dichloro - 4' - hydroxybutyrophenone.—Butyryl chloride (128.0 g., 1.2 moles), 2,3 dichloroanisole (197.7 g., 1.11 moles) and carbon disulfide (400 ml.) are placed in a four-neck flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 moles). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for one hour, then in a water bath at 55° C. for 45 minutes and then kept at room temperature overnight.

n-Heptane (400 ml.) and aluminum chloride (160 g., 1.2 moles) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for three hours and then allowed to cool. The hexane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (2–3 teaspoons) and filtered by suction through a pad of diatomaceous earth. Upon acidification, a light brown solid separates. This is collected by filtration, washed with water and dried at 100° C. for three hours.

The dried solid is dissolved in hot benzene (one liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%), M.P. 109–110.5° C., is collected by filtration. The product is taken up in 1500 ml. of hot benzene, treated with decolorizing carbon and filtered. Upon cooling, a white solid identified as 2',3'-dichloro-4'-hydroxybutyrophenone (180 g., 75%), M.P. 109–110° C., separates.

Analysis for $C_{10}H_{10}Cl_2O_2$. Calculated: C, 51.52; H, 4.32; Cl, 30.42. Found: C, 51.70; H, 4.24; Cl, 30.32.

*Step C:* Ethyl (2,3-dichloro - 4 - butyrylphenoxy)acetate.—Dry 1,2-dimethoxyethane (100 ml.) is placed in a one-liter, four-neck, round-bottom flask equipped with a stirrer, reflux condenser (protected by a calcium chloride tube) and a dropping funnel. Sodium hydride (10.3 g. of a 53% solution in mineral oil, 0.215 mole) is added, the stirrer started and a solution of 4-butyryl-2,3-dichlorophenol (50 g., 0.215 mole) in dry 1,2-dimethoxyethane (150 ml.) is added, dropwise, over a period of 30 minutes. After the evolution of gas has ceased, ethyl bromoacetate (35.9 g., 0.215 mole) is introduced, dropwise, over 30 minutes.

The mixture is stirred and heated on a steam bath for 3.5 hours. The major portion of the 1,2-dimethoxyethane is removed by distillation, then ether (400 ml.) and sufficient water to dissolve the precipitated sodium bromide are added. The ether layer is separated, washed with water and dried over anhydrous sodium sulfate. The ether is removed by distillation and the residue is distilled in vacuo. The portion boiling at 180–195° C. at 0.5 mm. mercury pressure is collected. Upon standing, the distillate crystallizes to a white solid, M.P. 53–54° C. The yield is 64 g. (95%). Recrystallization from a 1:5 mixture of benzene and cyclohexane gives ethyl (2,3-dichloro-4-butyrylphenoxy)acetate melting at 55–56° C.

Analysis for $C_{14}H_{16}Cl_2O_4$. Calculated: C, 52.68; H, 5.05; Cl, 22.22. Found: C, 52.79; H, 5.03; Cl, 22.07.

*Step D:* (2,3-dichloro-4-butyrylphenoxy)acetic acid.—Ethyl (2,3-dichloro - 4 - butyrylphenoxy)acetate (30 g., 0.095 mole) is dissolved in methanol (100 ml.) and is treated with a solution of 85% potassium hydroxide (13.2 g., 0.2 mole) in methanol (100 ml.). The mixture is stirred for an hour and then the methanol is removed by distillation at reduced pressure. The residue is dissolved in hot water and the solution cooled and acidified with hydrochloric acid. The solid that separates is (2,3-dichloro-4-butyrylphenoxy)acetic acid. The yield is 26 g.

(95%) of material which, after recrystallization from a 1:3.6 mixture of benzene and cyclohexane, melts at 110.5–111.5° C. (A dimorphic form melting at 100–101° C. is sometimes isolated.)

Analysis for $C_{12}H_{12}Cl_2O_4$. Calculated: C, 49.51; H, 4.15; Cl, 24.36. Found: C, 49.81; H, 4.22; Cl, 24.40.

*Step E:* [2,3-dichloro - 4 - [2 - (dimethylaminomethyl)-butyryl]phenoxy]acetic acid hydrochloride.—In a 100 ml. round flask equipped with an outlet tube suitable for connecting to a water aspirator is placed an intimate mixture of (2,3-dichloro-4-butyrylphenoxy)acetic acid (5.20 g., 0.0179 mole), paraformaldehyde (0.63 g., 0.072 mole), dry dimethylamine hydrochloride (1.59 g., 0.0195 mole) and four drops acetic acid. The mixture is heated on the steam bath for about 1.5 hours and during this period the internal pressure of the vessel is reduced to about 15 mm. mercury for a period of one minute at 15-minute intervals. Upon cooling, a solid is obtained which is triturated with ether to give 5.8 g. (85%) of [2,3-dichloro - 4 - [2 - (dimethylaminomethyl)butyryl] phenoxy]acetic acid hydrochloride in the form of a white solid. After two recrystallizations carried out by dissolving the solid in hot methanol and gradually adding ether, the product melts at 165–167° C.

Analysis for $C_{15}H_{20}OCl_3NO_4$. Calculated: C, 46.83; H, 5.24; Cl, 27.65; N, 3.64. Found: C, 46.69; H, 5.31; Cl, 27.59; N, 3.53.

*Step F:* [2,3-dichloro-4-[2-(methylthiomethyl)butyryl] phenoxy]acetic acid.—[2,3 - dichloro - 4 - [2 - (dimethylaminomethyl)butyryl]phenoxy]acetic acid hydrochloride (3.76 g., 0.015 mole) is dissolved in a solution containing sodium bicarbonate (2.52 g., 0.03 mole) and water (150 ml.). The solution is stirred and a stream of gaseous methyl mercaptan is admitted below the surface of the solution for 15 minutes. The addition of methyl mercaptan is continued while the stirred solution is heated on a steam bath for 1½ hours.

After cooling the reaction mixture to room temperature, it is made acid to Congo red test paper by the addition of 6 moles of ammonium chloride. The resulting gum is extracted with ether and the combined extracts are dried over anhydrous magnesium sulfate. The ether is evaporated under reduced pressure to give a white solid, M.P. 82–86° C. Recrystallization from a mixture of benzene and cyclohexane gives 15.0 g. (86%) of [2,3 - dichloro-4-[2-(methylthiomethyl)butyryl]phenoxy] acetic acid in the form of white prisms, M.P. 86–89° C.

Analysis for $C_{14}H_{16}Cl_2O_4S$. Calculated: C, 47.87; H, 4.59; S, 9.13. Found: C, 48.13; H, 4.56; S, 9.07.

*Step G:* [2,3-dichloro-4-(2-methylenebutyryl)phenoxy] acetic acid.—[2,3 - dichloro-4-[2 - methylthiomethyl)butyryl]phenoxy] acetic acid (1.05 g., 0.003 mole) is suspended in water (10 ml.) and dissolved by adding aqueous sodium bicarbonate solution to give a pH of 9.0. A solution of silver nitrate (1.02 g., 0.006 mole) in water (50 ml.) is added and the resulting suspension is heated on a steam bath with stirring for one hour. Additional aqueous sodium bicarbonate solution is added as needed to maintain pH 9.0. The cooled reaction mixture is made acid to Congo red test paper by the addition of ammonium chloride. The mixture is shaken with methylene chloride and filtered to remove an insoluble solid. The organic layer is separated and dried over anhydrous magnesium sulfate. The solvent is removed under reduced pressure to give 0.83 g. (91%) of white solid, M.P. 116–119° C. Recrystallization from carbon tetrachloride gives [2,3-dichloro-4-(2 - methylenebutyryl)phenoxy]acetic acid melting at 124–125° C.

Analysis for $C_{13}H_{12}Cl_2O_4$. Calculated: C, 51.51; H, 3.99; Cl, 23.39. Found: C, 51.23; H, 4.18; Cl, 23.49.

EXAMPLE 2

[2,3-dichloro-4-(2-methylenebutyryl)phenoxy]acetic acid

*Step A:* [2,3-dichloro-4-[2-(2-amino - 2 - carboxyethylthiomethyl)butyryl]phenoxy]acetic acid hydrochloride.— [2,3 - dichloro-4-[2 - (dimethylaminomethyl)butyryl]phenoxy]acetic acid hydrochloride, Example 1, Step E, (38.5 g., 0.1 mole) is suspended in water (500 ml.) and, with vigorous stirring, treated with a solution of sodium bicarbonate (16.8 g., 0.2 mole) in water (400 ml.). Then a solution containing L-cysteine (12.1 g., 0.1 mole) and sodium bicarbonate (8.4 g., 0.1 mole) in water (300 ml.) is added, the mixture rapidly heated to 80° C. for 10 minutes and then allowed to cool to 25° C.

After two hours the solution is treated with 12 N hydrochloric acid (25 ml., 0.3 mole). A gummy precipitate separates which redissolves upon continued stirring. The reaction mixture is evaporated to dryness at 35° C. using a rotary evaporator. The dry residue is extracted with dry isopropyl alcohol (600 ml.) at 30° C. The sodium chloride is removed by filtration and absolute ether (7.5 liters) is added to the filtrate.

The white precipitate which separates is removed by filtration and dried. The yield of [2,3-dichloro-4-[2-(2-amino - 2 - carboxyethylthiomethyl)butyryl]phenoxy] acetic acid hydrochloride is 32 g.; it sinters at 120° C. and melts at 170–177° C. This material is adequate for use in the next step. It can be further purified by suspension in water, dissolving by the addition of a minimum amount of dilute hydrochloric acid, filtering and adding concentrated hydrochloric acid whereby the product crystallizes, M.P. 186–188° C.

Analysis for $C_{16}H_{19}Cl_2NO_6S \cdot HCl$. Calculated: C, 41.71; H, 4.38; Cl, 23.08; N, 3.04. Found: C, 41.85; H, 4.50; Cl, 22.88; N, 2.89.

*Step B:* [2,3-dichloro-4-(2-methylenebutyryl)phenoxy] acetic acid.—[2,3-dichloro-4-[2-(2-amino-2-carboxyethylthiomethyl)butyryl]phenoxy]acetic acid hydrochloride (9.2 g., 0.02 mole) is suspended in water (150 ml.) and a saturated solution of sodium bicarbonate is added, with stirring, until the resulting solution reaches a pH of 9.0. A solution of silver nitrate (10.2 g., 0.06 mole) in water (150 ml.) is added. The resulting suspension is vigorously stirred for 30 minutes with occasional addition of sodium bicarbonate solution to maintain the pH at 9.0.

The reaction mixture is acidified with vigorous stirring by the addition of 6 N hydrochloric acid and then extracted with methylene chloride. The methylene chloride extract is dried over magnesium sulfate and the solvent removed by evaporation to give a nearly quantitative yield of [2,3-dichloro - 4 - (2-methylenebutyryl)phenoxy]acetic acid. After recrystallization from carbon tetrachloride or butyl chloride, the product melts at 124–125° C.

Analysis for $C_{13}H_{12}Cl_2O_4$. Calculated: C, 51.51; H, 3.99; Cl, 23.39. Found: C, 51.23; H, 4.18; Cl, 23.49.

EXAMPLE 3

[3-methoxy-4-(2-methylenebutyryl)phenoxy]acetic acid

*Step A:* (3-hydroxy-4-butyrylphenoxy)acetic acid.— Powdered aluminum chloride (191.08 g., 1.433 moles) and carbon disulfide (500 ml.) are placed in a one-liter, four-necked flask equipped with a stirrer, dropping funnel, reflux condenser and internal thermometer. (m-Methoxyphenoxy)acetic acid (80.6 g., 0.4424 mole) is added in portions with stirring and butyryl chloride (58.71 g., 0.551 mole) is added dropwise with stirring over a period of 0.5 hour at a temperature of about 22–26° C. After stirring one hour at room temperature the reaction flask is placed in a water bath and the temperature maintained at 50° C. for three hours. The carbon disulfide then is decanted and the aluminum complex remaining is added to a mixture of 500 g. of ice and 125 ml. of concentrated hydrochloric acid. There is thus obtained 15.6 g. (15%) of a yellow waxy solid which boils at 197–199° C. at 0.1 mm. pressure. Redistillation yields material boiling at 203–204° C. at 0.10 mm. pressure. Further recrystallization from a mixture of benzene and cyclohexane yields (3-hydroxy-4-butyrylphenoxy)acetic acid in the form of a white crystalline solid, M.P. 120–121° C.

Analysis for $C_{12}H_{14}O_5$. Calculated: C, 60.49; H, 5.92. Found: C, 60.46; H, 5.88.

*Step B:* (3-methoxy-4-butyrylphenoxy)acetic acid.— To a solution of 3-hydroxy-4-butyrylphenoxyacetic acid (10.9 g., 0.0458 mole) dissolved in 100 ml. of water containing sodium hydroxide (4.0 g., 0.1 mole) is added methyl sulfate (5.78 g., 0.0458 mole) over a period of 15 minutes at a temperature of 25–28° C. with stirring. The temperature is raised to 50° C. and the reaction solution treated simultaneously with methyl sulfate (8.67 g., 0.0687 mole) and a solution of sodium hydroxide (6.0 g., 0.15 mole) in 35 ml. of water over a period of 45 minutes at a temperature of 50–60° C. The reaction solution then is heated under reflux with stirring for an additional two hours. The boiling reaction solution is acidified with concentrated hydrochloric acid and the oil that forms solidifies after cooling to room temperature. There is thus obtained 3-methoxy-4-butyrylphenoxyacetic acid, M.P. 118–132° C., yield 11 g. (95%). After four recrystallizations from benzene the product is obtained in the form of white needles, M.P. 137–138° C. (Corr.)

Analysis for $C_{13}H_{16}O_5$. Calculated: C, 61.89; H, 6.39. Found: C, 61.47; H, 6.42.

*Step C:* [3-methoxy-4 - [12 - (dimethylaminomethyl) butyryl]phenoxy]acetic acid hydrochloride.—In a 100 ml. round flask equipped with an outlet tube suitable for application of intermittent suction an intimate mixture of (3-methoxy-4-butyrylphenoxy)-acetic acid (5.05 g., 0.02 mole), paraformaldehyde (0.70 g., 0.0233 mole), dry dimethylamine hydrochloride (1.78 g., 0.218 mole) and acetic acid (4 drops) is heated on a steam bath for about 1.5 hours during which period suction is applied for about one-minute intervals five or six times. Upon cooling a solid is obtained which, after triturating with ether, is recrystallized from methanol to yield [3-methoxy-4-[2-(dimethylaminomethyl)-butyryl]phenoxy]acetic acid hydrochloride.

*Step D:* [3-methoxy-4-[2-ethylthiomethyl)butyryl]-phenoxy]acetic acid.—By substituting ethyl mercaptan and [3 - methoxy - 4 - [2 - (dimethylaminomethyl)butyryl] phenoxy]acetic acid hydrochloride for the methyl mercaptan and [2,3-dichloro-4-[2-(dimethylaminomethyl) butyryl]phenoxy]acetic acid hydrochloride recited in Example 1, Step F, and following substantially the procedure described therein the product [3-methoxy-4-[2-(ethylthiomethyl)butyryl]phenoxy]acetic acid is obtained.

*Step E:* [3-methoxy-4-(2-methylenebutyryl)phenoxyl]-acetic acid.—By substituting [3-methoxy-4-[2-(ethylthiomethyl) - butyryl]phenoxy]acetic acid for the [2,3-dichloro-4-[2 - (methylthiomethyl)butyryl]phenoxy]acetic acid of Example 1, Step G, and following substantially the procedure described therein the product [3-methoxy-4-(2-methylenebutyryl)phenoxy]acetic acid, M.P. 110–112° C., is obtained.

Analysis for $C_{14}H_{16}O_5$. Calculated: C, 63.63; H, 6.10. Found: C, 63.70; H, 6.05.

EXAMPLE 4

(3-chloro-4-methacryloylphenoxy)acetic acid

*Step A:* (3 - chloro-4-propionylphenoxy)acetic acid.— Powdered aluminum chloride (216 g., 1.625 moles) and carbon disulfide (200 ml.) are placed in a one-liter, four-necked flask equipped with a stirrer, dropping funnel, reflux condenser and internal thermometer. (3-chlorophenoxy) acetic acid (93.29 g., 0.5 mole) is added in portions with stirring and then propionyl chloride (57.8 g., 0.625 mole) is added dropwise with stirring over a period of 0.5 hour at a temperature of about 22–26° C. After stirring one hour at room temperature, the reaction flask is placed in a water bath and the temperature maintained at 50° C. for three hours. The carbon disulfide then is decanted and the aluminum complex remaining is added to a mixture of 500 g. of ice and 125 ml. of concentrated hydrochloric acid. The yellow oil that forms is separated giving 77 g. of (3-chloro-4-propionylphenoxy)acetic acid, M.P. 108–109.5° C. (Corr.)

Analysis for $C_{11}H_{11}ClO_4$. Calculated: C, 54.44; H, 4.57; Cl, 14.61. Found: C, 54.88; H, 4.46; Cl, 14.36.

*Step B:* [3-chloro-4 - [2 - (dimethylaminomethyl)propionyl]-phenoxy]acetic acid hydrochloride.—In a 100 ml. round flask equipped with an outlet tube suitable for application of intermittent suction, an intimate mixture of (3-chloro-4-propionylphenoxy)acetic acid (14.52 g., 0.06 mole), paraformaldehyde (2.1 g., 0.072 mole), dry dimethylamine hydrochloride (5.34 g., 0.066 mole) and acetic acid (4 drops) is heated on the steam bath for about 1.5 hours during which period suction is applied for about one-minute intervals five or six times. Upon cooling, a solid (19 g.) is obtained which, after triturating with ether, melts at 147–149° C. Upon recrystallization from methanol there is obtained [3-chloro-4-[2-dimethylaminomethyl)propionyl]-phenoxy]acetic acid hydrochloride, M.P. 158–160° C.

Analysis for $C_{14}H_{15}ClNO_4 \cdot HCl$. Calculated: C, 50.09; H, 5.69; N, 4.16. Found: C, 49.98; H, 5.71; N, 4.10.

*Step C:* [3 - chloro - 4 - [2 - (isopropylthiomethyl)-propionyl]-phenoxy]acetic acid.—By substituting isopropyl mercaptan and [3 - chloro-4-[2-(dimethylaminomethyl) propionyl]phenoxy]acetic acid hydrochloride for the methyl mercaptan and [2,3-dichloro-4[2-(dimethylaminomethyl)butyryl]phenoxy] acetic acid hydrochloride recited in Example 1, Step F, and following substantially the procedure described therein the product [3-chloro-4-[2-(isopropylthiomethyl)propionyl]phenoxy]acetic acid is obtained.

*Step D:* (3-chloro-4-methacryloylphenoxy)acetic acid.— By substituting [3-chloro-4-[2-(isopropylthiomethyl)-propionyl]phenoxy]acetic acid for the [2,3-dichloro-4-[2-(methylthiomethyl)butyryl]phenoxy]acetic acid of Example 1, Step G, and following substantially the procedure described therein the product )3-chloro-4-methacryloylphenoxy)acetic acid is obtained, M.P. 128–129° C.

Analysis for $C_{12}H_{11}ClO_4$. Calculated: C, 56.54; H, 4.35; Cl, 13.93. Found: C, 56.31; H, 4.45; Cl, 14.10.

EXAMPLE 5

(3-methacryloylphenoxy)acetic acid

*Step A:* (3-propionylphenoxy)acetic acid.—A solution of 3-propionylphenol (15.0 g., 0.1 mole) in 60 cc. of ethylene glycol dimethyl ether is added to a suspension of sodium hydride (2.4 g., 0.1 mole) in 40 cc. of the same solvent. Then ethyl bromoacetate (18.4 g., 0.11 mole) is added during 25 minutes. The mixture is refluxed one hour and the precipitated sodium bromide is filtered off and solvent distilled in vacuo. To the residue is added 80 cc. of 10% sodium hydroxide solution and the mixture heated on the steam bath for 10 minutes until a clear solution is formed. The solution is acidified to precipitate the product which soon crystallizes. Recrystallization from a mixture of benzene and cyclohexane gives (3-propionylphenoxy)acetic acid, M.P. 72–78° C.

*Step B:* [3 - [2 - (dimethylaminomethyl)propionyl] phenoxy]acetic acid hydrochloride.—A mixture of (3-propionylphenoxy)acetic acid (17.0 g., 0.082 mole), paraformaldehyde (3.2 g., 0.105 mole), dimethylamine hydrochloride (7.4 g., 0.9 mole) and 0.8 cc. of acetic acid is heated 1.7 hours on the steam bath. The crystalline mass thus obtained is triturated with 120 cc. boiling isopropyl alcohol. The insoluble [3-[2-(dimethylaminomethyl)-propionyl]phenoxy]acetic acid hydrochloride weighs 18.0 g., M.P. 148–152° C.

*Step C:* [3-[2-(o-carboxyphenylthiomethyl)propionyl] phenoxy]acetic acid.—By following substantially the procedure described in Example 1, Step F, but substituting solid thiosalicylic acid for the methyl mercaptan recited recited therein, the product [3-[2-(o-carboxyphenylthiomethyl)propionyl]phenoxy]acetic acid is obtained.

*Step D:* (3-methacryloylphenoxy)acetic acid.—By following substantially the procedure described in Example 1, Step G, but substituting [3-[2-(o-carboxyphenylthiomethyl)propionyl]phenoxy]acetic acid for the [2,3-dichloro-4-[2 - (methylmercaptomethyl)butyryl]phenoxy] acetic acid recited therein the product (3-methacryloylphenoxy)acetic acid is obtained, M.P. 69–71° C.

Analysis for C₁₂H₁₂O₄. Calculated: C, 65.44; H, 5.49. Found: C, 65.43; H, 5.79.

EXAMPLE 6

[2-(2-methylenebutyryl)-3,5-dimethylphenoxy]acetic acid

*Step A:* 2-butyryl–3,5-dimethylphenol.—To a solution of 3,5-dimethylphenol (18.3 g., 0.15 mole) in 60 cc. of pyridine is added, during 15 minutes while cooling in an ice bath, butyryl chloride (19.2 g., 0.18 mole). The mixture is permitted to stand one hour at room temperature and then is diluted with 300 cc. of water to give an oily product which is taken up in ether. The ether solution is washed thoroughly with dilute acid and water, dried and the ether evaporated to leave the butyric acid ester of 3,5-dimethylphenol. The ester is mixed with aluminum chloride (38.7 g., 0.29 mole) and then heated 1.6 hours on the steam bath. The reaction mixture is poured onto ice and the solid product obtained is recrystallized from cyclohexane to give 2-butyryl-3,5-dimethylphenol, M.P. 57–58° C.

Analysis for C₁₂H₁₆O₂. Calculated: C, 74.97; H, 8.39. Found: C, 74.63; H, 8.35.

*Step B:* (2-butyryl-3,5-dimethylphenoxy)acetic acid.—By substituting 2-butyryl-3,5-dimethylphenol for the 3-propionylphenol of Example 5, Step A, and following substantially the procedure described therein, the compound (2-butyryl-3,5-dimethylphenoxy)acetic acid is obtained which, after recrystallization from aqueous acetic acid, melts at 108–109° C.

*Step C:* [2-[2-(dimethylaminomethyl)butyryl]-3,5-dimethylphenoxy]acetic acid hydrochloride.—By substituting (2-butyryl-3,5-dimethylphenoxy)acetic acid for the (3-chloro-4-propionylphenoxy)acetic acid of Example 4, Step B, and following substantially the procedure described therein the compound [2-[2-(dimethylaminomethyl)butyryl]-3,5-dimethylphenoxy]acetic acid hydrochloride is obtained having a melting point of 165–167° C.

*Step D:* [3,5 - dimethyl - 4 - [2-(2,2-dichloroethylthiomethyl)-butyryl]phenoxy]acetic acid.—By following substantially the procedure described in Example 1, Step F, but substituting [2-[2-(dimethylaminomethyl)-butyryl]-3,5-dimethylphenoxy]acetic acid hydrochloride and 2,2-dichloroethyl mercaptan, respectively, for the [2,3-dichloro - 4 - [2-(dimethylaminomethyl)butyryl]phenoxy] acetic acid hydrochloride and methyl mercaptan recited therein, the product [3,5 - dimethyl - 4-[2-(2,2-dichloroethylthiomethyl)-butyryl]phenoxy]acetic acid is obtained.

*Step E:* [2 - (2 - methylenebutyryl)-3,5-dimethylphenoxy]acetic acid.—By following substantially the procedure described in Example 1, Step G, but substituting [3,5 - dimethyl - 4 - [2-(2,2-dichloroethylthiomethyl)butyryl]phenoxy]acetic acid for the [2,3-dichloro - 4 - [2-(methylmercaptomethyl)butyryl]phenoxy] - acetic acid recited therein the product [2-(2-methylenebutyryl)-3,5-dimethylphenoxy]acetic acid is obtained, M.P. 109.5–111.0° C.

Analysis for C₁₅H₁₈O₄. Calculated: C, 68.68; H, 6.92. Found: C, 68.68; H, 7.04.

EXAMPLE 7

[2,3-dichloro-4-(2-methylenebutyryl)phenoxy] acetic acid

*Step A:* bis[2 - (2,3 - dichloro - 4-carboxymethoxybenzoyl) - butyl]sulfide.—[2,3 - dichloro - 4 - [2-(dimethylaminomethyl)butyryl]phenoxy] - acetic acid hydrochloride, Example 1, Step E, (5.76 g., 0.015 mole) is dissolved in a solution containing sodium bicarbonate (2.52 g., 0.03 mole) and water (150 ml.). A slow stream of hydrogen sulfide is passed through the solution for 0.5 hour and the mixture then is acidified with hydrochloric acid. The bis[2-(2,3-dichloro-4-carboxymethoxybenzoyl)butyl] sulfide thus obtained is crystallized by dissolving in hot ethyl acetate and precipitating by the slow addition of a ligroin.

*Step B:* [2,3-dichloro-4-(2-methylenebutyryl)phenoxy]acetic acid.—By following substantially the procedure described in Example 1, Step G, but substituting bis[2-(2,3-dichloro-4-carboxymethoxybenzoyl)butyl]sulfide for the [2,3 - dichloro -4- [2 - (methylmercaptomethyl)butyryl] phenoxy]acetic acid recited therein the product [2,3-dichloro-4-(2-methylenebutyryl)phenoxy]acetic acid, M.P. 124–125° C. is obtained.

Analysis for C₁₃H₁₂Cl₂O₄. Calculated: C, 51.51; H, 3.99; Cl, 23.39. Found: C, 51.23; H, 4.18; Cl, 23.49.

EXAMPLE 8

(3-methacryloyl-4-chlorophenoxy)acetic acid

*Step A:* 2 - chloro-5-nitropropiophenone.—2 - chloropropiophenone (84.5 g., 0.5 mole) is added to 300 cc. of fuming nitric acid (density 1.5) at a temperature of 5–10° C. during 18 minutes. The mixture is allowed to stand at 0–5° C. for 30 minutes and then poured into ice water. The solid product is recrystallized from isopropyl alcohol to give 75 g. of 2-chloro-5-nitropropiophenone, M.P. 52–56° C. After recrystallization from isopropyl alcohol, the product has a melting point of 54–56° C.

Analysis for C₉H₃ClNO₃. Calculated: C, 50.60; H, 3.77; N, 6.56. Found: C, 51.47; H, 4.01; N, 6.62.

*Step B:* 2-chloro-5-aminopropiophenone.—A solution of 2-chloro-5-nitropropiophenone (25.9 g., 0.121 mole) in 60 cc. of acetic acid is added to 240 cc. of a 7.5 N hydrochloric acid solution in which is dissolved 100 g. of stannous chloride dihydrate. The solution is heated one hour on the steam bath and then made basic by addition of sodium hydroxide solution. The oily product is taken up in ether, the ether then evaporated to give a yellow oil weighing 18 g. Upon distillation the product has a boiling point of 143–146° C. at 0.5 mm. pressure.

Analysis for C₉H₁₀ClNO. Calculated: C, 58.86; H, 5.49; N, 7.63. Found: C, 59.10; H, 5.58; N, 7.54.

*Step C:* 3-propionyl - 4 - chlorophenol.—2 - chloro - 5-amino-propiophenone (48.5 g., 0.26 mole) is dissolved in 192 cc. of water and 26 cc. of concentrated sulfuric acid and diazotized with a solution of sodium nitrite (17.9 g., 0.26 mole) in 40 cc. of water. The diazonium mixture is added dropwise during 30 minutes to a stirred mixture of 340 cc. of 1 N sulfuric acid containing cupric sulfate pentahydrate (48 g., 0.19 mole) and 250 cc. of toluene. The toluene layer then is separated and extracted with a 5% solution of sodium hydroxide. Acidification precipitates an oily product which is purified by distillation to give 13.0 g. of 3-propionyl-4-chlorophenol, B.P. 135–140° C. at 0.5 mm. pressure.

*Step D:* 3-propionyl - 4 - chlorophenoxyacetic acid.—A solution of 3-propionyl-4-chlorophenol (18.4 g., 0.1 mole) in 60 cc. of ethylene glycol dimethyl ether is added to a suspension of 0.1 mole of sodium hydride in 40 cc. of the same solvent. Then 0.11 mole of ethyl bromoacetate is added during 25 minutes. The mixture is refluxed one hour and the precipitated sodium bromide is filtered off and solvent distilled in vacuo. To the residue is added 80 cc. of 10% sodium hydroxide solution and the mixture heated on the steam bath for 10 minutes until a clear solution is formed. The solution is acidified to precipitate the product which soon crystallizes. Recrystallization from a mixture of benzene and cyclohexane gives 3-propionyl-4-chlorophenoxyacetic acid, M.P. 77.5–80.5° C.

*Step E:* 3-[2-(1 - piperidylmethyl)propionyl]-4-chlorophenoxyacetic acid hydrochloride.—A mixture of 14.6 g.

(0.06 mole) of 3-propionyl-4-chlorophenoxyacetic acid, 2.5 g. (0.085 mole) of paraformaldehyde, 8.2 g. (0.066 mole) of piperidine hydrochloride and 1 cc. of alcoholic hydrogen chloride is heated 1.5 hours on the steam bath. The solid crystalline cake which is obtained is triturated with boiling isopropyl alcohol to give 10.7 g. of 3-[2-(1-piperidylmethyl)propionyl] - 4 - chlorophenoxyacetic acid hydrochloride, M.P. 162–167° C.

*Step F:* [3-[2-(methylthiomethyl)propionyl]-4-chlorophenoxy]acetic acid.—By following substantially the procedure described in Example 1, Step F, but substituting 3-[2-(1-piperidylmethyl)-propionyl] - 4 - chlorophenoxyacetic acid hydrochloride for the [2,3-dichloro-4-[2-(dimethylaminomethyl)butyryl]phenoxy]acetic acid hydrochloride recited therein the product [3-[2-(methylthiomethyl)propionyl] - 4 - chlorophenoxy]acetic acid is obtained.

*Step G:* (3 - methacryloyl - 4 - chlorophenoxy)acetic acid.—By following substantially the procedure described in Example 1, Step G, but substituting [3-[2-(methylthiomethyl)-propionyl]-4-chlorophenoxy]acetic acid for the [2,3-dichloro-4-[2 - (methylmercaptomethyl)butyryl]phenoxy]acetic acid recited therein the product (3-methacryloyl-4-chlorophenoxy)acetic acid is obtained, M.P. 98–99.5° C.

Analysis for $C_{12}H_{11}ClO_4$. Calculated: C, 56.59; H, 4.35; Cl, 13.93. Found: C, 56.99; H, 4.44; Cl, 13.84.

EXAMPLE 9

[3-trifluoromethyl-4-(2-methylenebutyryl)phenoxy] acetic acid

*Step A:* 3-trifluoromethyl-4-bromophenyl allyl ether.—3-trifluoromethyl-4-bromophenol (12.05 g., 0.05 mole) dissolved in methanol is added to a solution of 2.81 g. (0.05 mole) of potassium hydroxide in 35 ml. of an 85% methanol solution. The methanol is evaporated and the residue is dissolved in 50 ml. of glycol dimethyl ether (i.e., glyme). Allyl bromide (6.05 g., 0.05 mole) is added and the mixture is refluxed for 1½ hours. After removal of the potassium bromide, the solvent is evaporated and the residue distilled to obtain 10.5 g. of 3-trifluoromethyl-4-bromophenyl allyl ether, B.P. 78° C./1 mm.

*Step B:* 3-trifluoromethyl - 4 - (1-hydroxybutyl)phenyl allyl ether.—To a mixture of 2.60 g. (0.14 mole) of magnesium turnings in 150 ml. of ether there is added 20 g. (0.0712 mole) of 3-trifluoromethyl-4-bromophenyl allyl ether. The reaction is initiated and maintained by the slow addition of 12.4 g. (0.0712 mole) of ethylene bromide. After the magnesium has been consumed, 5.12 g. (0.0712 mole) of butyraldehyde is added and the mixture is refluxed for 1½ hours, cooled and added to a saturated ammonium chloride solution. The product is isolated by extraction with ethyl ether and the ether extract distilled to obtain 11.0 g. of an oil having a boiling point of 70–102° C./0.3 mm. The oil (7.92 g.) is placed on a 4 cm. column of 350 g. of alumina and eluted with benzene until the effluent contains no solute. The product is then eluted with a 2:1 mixture of benzene and ether and then was a 1:2 mixture of benzene and ether until the effluent contains no solute. The combined benzene-ether effluents are evaporated to obtain 5.5 g. of 3-trifluoromethyl-4-(1-hydroxybutyl)phenyl allyl ether ($n_D^{25}$ 1.4836).

*Step C:* 3-trifluoromethyl-4-butyrylphenyl allyl ether.—3-trifluoromethyl - 4 - (1-hydroxybutyl)phenyl allyl ether (5.3 g., 0.0193 mole) is dissolved in 30 ml. of acetone and the solution maintained at 0° C. while a solution of 3.86 g. (0.0396 mole) of chromium trioxide in a mixture of 10 ml. of water and 3.26 ml. of concentrated sulfuric acid is added slowly with stirring. After stirring for an additional two hours, cold water is added and the mixture is extracted with ether. After drying the extract thus obtained with sodium sulfate, the ether is evaporated and the residue distilled at 0.3 mm. to yield 4.9 g. of 3-trifluoromethyl-4-butyrylphenyl allyl ether.

*Step D:* (3-trifluoromethyl - 4 - butyrylphenoxy)acetic acid.—3-trifluoromethyl-4-butyrylphenyl allyl ether (4.4 g., 0.018 mole) and 1.0 g. of sodium bicarbonate are added to 80 ml. of acetone and the mixture maintained at −10° C. while 8.54 g. (0.054 mole) of potassium permanganate is added slowly. The mixture is stirred for two hours, diluted with water and treated with sulfur dioxide until a colorless solution is obtained. The product is extracted with ether and the ether extract is in turn extracted with a 5% sodium bicarbonate solution. The extract thus obtained is chilled and acidified with 12 N hydrochloric acid and again extracted with ether. The ether extract is dried and evaporated and the residue crystallized from benzene to obtain 1.5 g. of (3-trifluoromethyl-4-butyrylphenoxy)-acetic acid, M.P. 96–97° C.

*Step E:* [3 - trifluoromethyl-4-[2-(dimethylaminomethyl)butyryl]phenoxy]acetic acid hydrochloride.—A 50 ml., round-bottomed flask is charged with (3-trifluoromethyl-4-butyrylphenoxy)acetic acid (0.5 g., 0.0017 mole), paraformaldehyde (0.06 g., 0.002 mole), dimethylamine hydrochloride (0.149 g., 0.0018 mole) and five drops of acetic acid and the mixture is heated on a steam bath for one hour. The mixture then is cooled and triturated with ether whereupon 0.52 g. of [3-trifluoromethyl-4-[2-(dimethylaminomethyl)butyryl]phenoxy]acetic acid hydrochloride is obtained in the form of a granular white precipitate, M.P. 105–128° C.

*Step F:* [3-trifluoromethyl - 4 - [2-(methylthiomethyl) butyryl]phenoxy]acetic acid.—By substituting [3 - trifluoromethyl - 4 - [2 - (dimethylaminomethyl)butyryl] phenoxy]acetic acid hydrochloride for the [2,3-dichloro-4-[2-(dimethylaminomethyl)butyryl]phenoxy]acetic acid hydrochloride of Example 1, Step F, and following the procedure described therein the product [3-trifluoromethyl-4-[2 - (methylthiomethyl)butyryl]phenoxy]acetic acid is obtained.

*Step G:* [3-trifluoromethyl - 4 - (2 - methylenebutyryl) phenoxy]acetic acid.—By substituting [3-trifluoromethyl-4-[2-(methylthiomethyl)butyryl]phenoxy]acetic acid for the [2,3-dichloro - 4 - [2 - (methylthiomethyl)butyryl] phenoxy]acetic acid of Example 1, Step G, and following the procedure described therein 0.2 g. of [3-trifluoromethyl-4-(2-methylenebutyryl)phenoxy]-acetic acid is obtained in the form of a yellow solid, M.P. 103–105° C. The product is recrystallized from approximately one ml. of benzene to yield 0.08 g. of [3-trifluoromethyl-4-(2-methylenebutyryl)phenoxy] acetic acid which melts at 107–108° C.

Analysis for $C_{14}H_{13}F_3O_4$. Calculated: C, 55.63; H, 4.33; F, 18.86. Found: C, 56.10; H, 4.50; F, 18.25.

In a manner similar to that described in Example 4, supra, for the preparation of (3-chloro-4-methacryloyl)-phenoxyacetic acid, other [(2 - methylenealkanoyl) phenoxy]-alkanoic acid products (I) of the invention may be obtained. Thus, by substituting the appropriate phenoxyalkanoic acid, alkanoyl halide and mercaptan for the (3-chlorophenoxy)acetic acid, propionyl chloride and isopropyl mercaptan of Example 4, Steps A and C and following substantially the procedure described in Steps A, B, C and D of that example, many of the [(2-methylenealkanoyl)phenoxy]alkanoic acids (I) of the invention may be obtained. The following equations, wherein the integer w is as defined above, illustrate the reaction of Example 4, Steps A, B, C and D and, together with Table I (infra), depict the alkanoyl halide, phenoxyalkanoic acid and mercaptan starting materials of the process and the corresponding products (Ib) obtained therefrom:

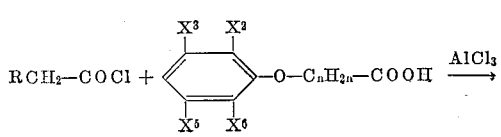

17

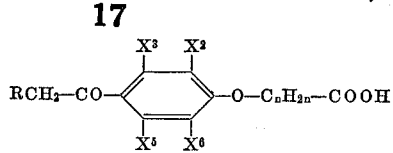

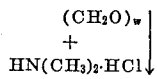

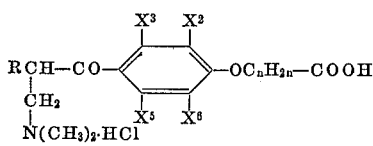

18

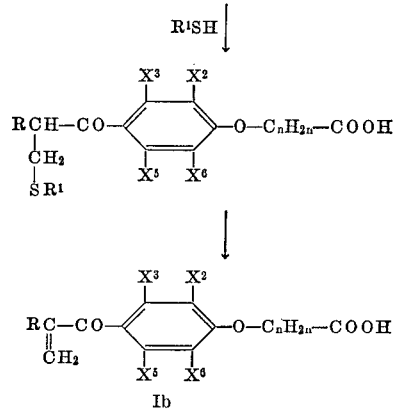

TABLE I

| Ex. | R | R¹ | X² | X³ | X⁵ | X⁶ | —$C_nH_{2n}$— | M.P. of Product (Ib), °C. |
|---|---|---|---|---|---|---|---|---|
| 10 | —$C_2H_5$ | —$C_2H_5$ | H | Cl | H | H | —$CH_2$— | 109–111 |
| 11 | —$C_2H_5$ | —$CH_2CH(NH_2)COOH·HCl$ | H | Cl | H | H | —$CH_2$— | 109–111 |
| 12 | —$C_2H_5$ | —$CH_2CH(NH_2)COOH·HCl$ | —$CH_3$ | —$CH_3$ | H | H | —$CH_2$— | 83.5–84.5 |
| 13 | —$C_2H_5$ | $CH_2CHCONHCH_2COOH$<br>　　$\|$<br>$NHCO(CH_2)_2CH(NH_2)COOH$<br>　　$\cdot HCl$ | | | | | | |
| 14 | —$C_2H_5$ | —$CH_2COOH$ | Cl | Cl | H | H | —$CH_2$— | 124–125 |
| 15 | —$C_2H_5$ | —$CH_2CH_2CH_2Cl$ | Cl | Cl | H | H | —$CH_2$— | 124–125 |
| 16 | —$C_2H_5$ | —$CH_2CH(NH_2)COOH$ | Cl | Cl | H | H | —$CH_2$— | 124–125 |
| 17 | —$C_2H_5$ | —$CH_2CH_2CH_3$ | H | Cl | H | H | —$CH_2$— | 109–111 |
| 18 | —$C_2H_5$ | —$CH_2CH=CH_2$ | H | Cl | H | H | —$CH_2$— | 109–111 |
| 19 | —$C_2H_5$ | —$C(CH_3)_3$ | H | Cl | H | H | —$CH_2$— | 109–111 |
| 20 | —$C_2H_5$ | ⟨C₆H₁₀⟩—H | H | Cl | H | H | —$CH_2$— | 109–111 |
| 21 | —$C_2H_5$ | —$CH_2$—⟨phenyl⟩ | H | Cl | H | H | —$CH_2$— | 109–111 |
| 22 | —$C_2H_5$ | —⟨phenyl⟩ | H | Cl | H | H | —$CH_2$— | 109–111 |
| 23 | —$C_2H_5$ | —$(CH_2)_2COOH$ | H | Cl | H | H | —$CH_2$— | 109–111 |
| 24 | —$C_2H_5$ | —$COCH_3$ | H | Cl | H | H | —$CH_2$— | 109–111 |
| 25 | —$C_2H_5$ | —CO—⟨phenyl⟩ | H | Cl | H | H | —$CH_2$— | 109–111 |
| 26 | —$C_2H_5$ | —$CH_2COOH$ | H | Cl | H | H | —$CH_2$— | 109–111 |
| 27 | —$C_2H_5$ | —$CH_2CH_2OH$ | H | Cl | H | H | —$CH_2$— | 109–111 |
| 28 | —$C_2H_5$ | —$CH_2COOCH_3$ | H | Cl | H | H | —$CH_2$— | 109–111 |
| 29 | —$CH_3$ | —$CH_2COOH$ | H | Cl | H | H | —$CH_2$— | 128–129 |
| 30 | —$C_2H_5$ | —$C(CH_3)_3$ | Cl | Cl | H | H | —$CH_2$— | 124–125 |
| 31 | —$C_2H_5$ | —$CH_2CH=CH_2$ | Cl | Cl | H | H | —$CH_2$— | 124–125 |
| 32 | —$C_2H_5$ | —$COCH_3$ | Cl | Cl | H | H | —$CH_2$— | 124–125 |
| 33 | —$C_2H_5$ | —$CH_2$—⟨phenyl⟩ | Cl | Cl | H | H | —$CH_2$— | 124–125 |
| 34 | —$C_2H_5$ | ⟨C₆H₁₀⟩—H | Cl | Cl | H | H | —$CH_2$— | 124–125 |
| 35 | —$C_2H_5$ | —$C(CH_3)_2CH(COOH)NHCOCH_3$ | H | Cl | H | H | —$CH_2$— | 109–111 |
| 36 | —$C_2H_5$ | —$CH_2CHCONHCH_2COOH$<br>　　$\|$<br>$NHCO(CH_2)_2CH(NH_2)COOH$<br>　　$\cdot HCl$ | H | Cl | H | H | —$CH_2$ | 109–111 |
| 37 | —$C_2H_5$ | —$CH_2CH_2NH_2$ | H | Cl | H | H | —$CH_2$— | 109–111 |
| 38 | —$C_2H_5$ | ⟨phenyl-COOH⟩ | Cl | Cl | H | H | —$CH_2$— | 124–125 |
| 39 | —$C_2H_5$ | —$CH_2CH_2NH_2$ | Cl | Cl | H | H | —$CH_2$— | 124–125 |
| 40 | —$C_2H_5$ | —$CH_2CH(COOH)NHCOCH_3$ | Cl | Cl | H | H | —$CH_2$— | 124–125 |
| 41 | —$C_2H_5$ | —$CH_3$ | —$CH_3$ | —$CH_3$ | —$CH_3$ | —$CH_3$ | —$CH_2$— | 140.5–141.5 |
| 42 | —$C_2H_5$ | —$CH_2CH_2CH_2Cl$ | —$CH_3$ | H | —$CH_3$ | H | —$CH_2$— | 88–89.5 |
| 43 | —$C_2H_5$ | —$CH_2COOH$ | (¹) | (¹) | H | H | —$CH_2$— | 106–109 |
| 44 | —$C_2H_5$ | —$CH_2CH(COOH)NHCOCH_3$ | (²) | (²) | H | H | —$CH_2$— | 80–82 |
| 45 | —$C_2H_5$ | ⟨S-containing ring⟩ | Cl | —$CH_3$ | H | H | —$CH_2$— | 89–91 |

3,479,402

TABLE I

| Ex. | R | R¹ | X² | X³ | X⁵ | X⁶ | —$C_nH_{2n}$— | M.P. of Product (Ib), °C. |
|---|---|---|---|---|---|---|---|---|
| 46 | —⟨S⟩ | —$CH_2$—⟨⟩ | H | Cl | H | H | —$CH_2$— | 127–128 |
| 47 | —⟨S⟩—$CH_3$ | —$(CH_2)_2CH_3$ | H | Cl | H | H | —$CH_2$— | |
| 48 | —$CH_3$ | —$CH_2CH=CH_2$ | H | Cl | H | H | —$CH(CH_3)$— | 115.5–116.5 |
| 49 | —$CH_3$ | —⟨⟩COOH | H | Cl | H | H | —$CH_2$—$CH_2$— | 72.5–73.5 |
| 50 | —$C_2H_5$ | —⟨⟩ | H | Cl | H | H | —$CH[CH(CH_3)_2]$— | 94–95.5 |
| 51 | —$C_2H_5$ | —$CH_2CH(SH)CH_2OH$ | Cl | Cl | H | H | —$CH_2$— | 124–125 |

¹ —CH=CH—CH=CH—
² —$CH_2$—$CH_2$—$CH_2$—

Also, in a manner similar to that described in Example 1, supra, for the preparation of [2,3-dichloro-4-(2-methylene-butyryl)phenoxy]acetic acid, still other [(2-methylenealkanoyl)-phenoxy]alkanoic acid products (I) of this invention may be obtained. Thus, by substituting the appropriate alkanoic acid halide, phenol ether, alkyl haloalkanoate, secondary amine hydrochloride and mercaptan for the butyryl chloride, 2,3-dichloroanisole, ethyl bromoacetate, dimethylamine hydrochloride and methyl mercaptan of Example 1, Steps B, C, E and F and following substantially the procedure described in Steps B–G of that example, many of the [(2-methylenealkanoyl) phenoxy]-alkanoic acids (I) of the invention may be obtained. The following equations, wherein the integer w is as defined above, illustrate the reaction of Example 1, Steps B–G and, together with Table II (infra), depict the alkanoyl halide, phenol ether, alkyl haloalkanoate, secondary amine hydrochloride and mercaptan starting materials of the process and the corresponding products obtained therefrom:

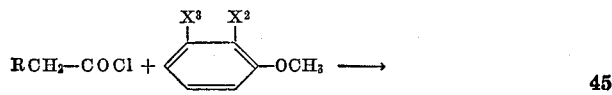

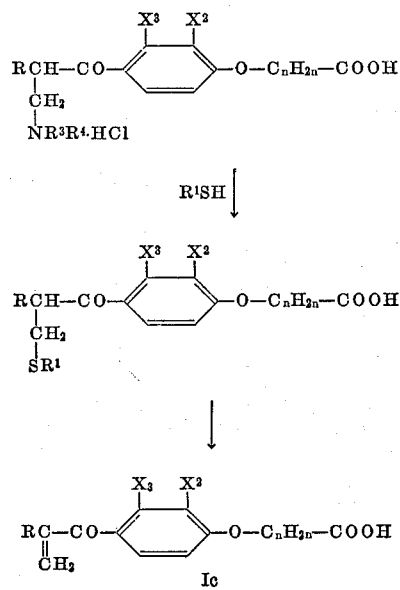

TABLE II

| Ex. | R | R¹ | R³ | R⁴ | R⁵ | X¹ | X² | X³ | —$C_nH_{2n}$— | M.P. of Product (Ic), °C. |
|---|---|---|---|---|---|---|---|---|---|---|
| 52 | —$CH_2CF_3$ | —$CH_3$ | —$CH_3$ | —$CH_3$ | —$C_2H_5$ | Br | Cl | Cl | —$CH_2$— | 82–84 |
| 53 | —$C_2H_5$ | —$(CH_2)_2$—$CH(NH_2)COOH$ | —$CH_3$ | —$CH_3$ | —$C_2H_5$ | Br | —$CH_2$—$CH_2$—$CH_2$—$CH_2$— | | —$CH_2$— | 89–91 |
| 54 | —⟨⟩ | —⟨S⟩ | (¹) | (¹) | —$C_2H_5$ | Br | H | Cl | —$CH_2$— | 124–125 |

¹ —$CH_2$—$(CH_2)_3$—$CH_2$—

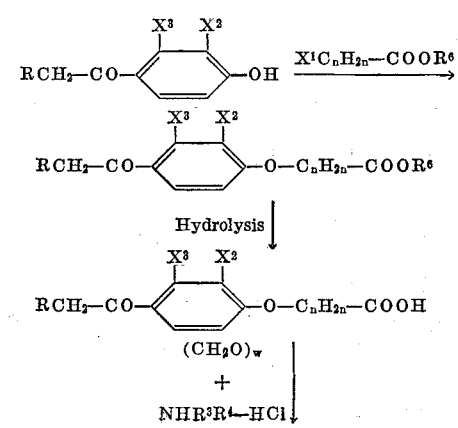

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic lethal dose of the products.

A suitable unit dosage form of the products of this invention can be administered by mixing 50 mg. of a [(2-methylenealkanoyl)phenoxy]alkanoic acid (I) or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 55

Dry-filled capsules containing 50 mg. of active ingredient per capsule

| | Per capsule, mg. |
|---|---|
| [2,3 - dichloro - 4 - (2 - methylenebutyryl)phenoxy] acetic acid | 50 |
| Lactose | 144 |
| Magnesium stearate | 6 |
| Capsule size No. 3 | 200 |

The [2,3-dichloro - 4 - (2-methylenebutyryl)phenoxy] acetic acid is reduced to a No. 60 powder and lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of one or more of the other novel compounds of this invention and varying the amounts of the ingredients to obtain the desired dosage.

It will be apparent from the foregoing description that the [(2-methylenealkanoyl)phenoxy]alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A process for preparing a compound having the formula:

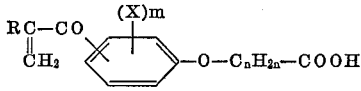

wherein R is a member selected from the group consisting of hydrogen, alkyl, trihalomethyl substituted lower alkyl, cycloalkyl, alkylcycloalkyl and mononuclear aryl; the X radicals are similar or dissimilar members selected from the group consisting of hydrogen, halogen, trihalomethyl, lower alkyl, lower alkoxy and, when substituted on adjacent carbon atoms of the benzene ring, two X radicals may be combined to form an hydrocarbylene chain selected from trimethylene, tetramethylene and 1,3-butadienylene; $m$ is an integer having a value of one to four and $n$ is an integer having a value of one to four; which comprises the reaction of a compound having the formula:

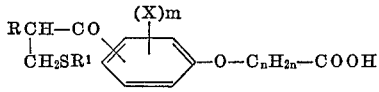

wherein R, X, $m$ and $n$ are as defined above and $R^1$ is a member selected from the group consisting of alkyl, hydroxyalkyl, mercapto substituted hydroxyalkyl, haloalkyl, polyhaloalkyl, carboxyalkyl, alkoxycarbonylalkyl, alkanamido substituted carboxyalkyl, aminoalkyl, amino substituted carboxyalkyl, mononuclear aralkyl, alkenyl, cycloalkyl, mononuclear aryl, carboxyphenyl, alkanoyl, benzoyl, 2-(gamma-L-glutamylamino)-2-(N-carboxymethylcarbamoyl)alkyl and carboxymethoxybenzoylalkyl wherein the benzene ring may be unsubstituted or substituted by one to four X substituents, wherein X is as defined above; with silver nitrate in a basic reaction medium, followed by the treatment of the carboxylate salt intermediate thus formed with an acid to obtain the desired product.

2. A process for preparing a compound having the formula:

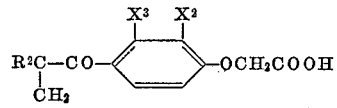

wherein $R^2$ is a member selected from the group consisting of lower alkyl and trihalomethyl substituted lower alkyl; $X^2$ and $X^3$ each represent similar or dissimilar members selected from the group consisting of hydrogen, halogen, lower alkyl and, taken together, the $X^2$ and $X^3$ radicals may be joined to form a 1,3-butadienylene chain; which comprises the reaction of a compound having the formula:

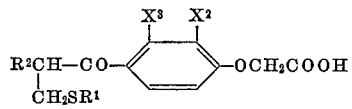

wherein $R^2$, $X^2$ and $X^3$ are as defined above and $R^1$ is a member selected from the group consisting of alkyl, hydroxyalkyl, mercapto-hydroxyalkyl, haloalkyl, polyhaloalkyl, carboxyalkyl, alkoxycarbonylalkyl, alkanamido substituted carboxyalkyl, aminoalkyl, amino substituted carboxyalkyl, mononuclear aralkyl, alkenyl, cycloalkyl, mononulcear aryl, carboxyphenyl, alkanoyl, benzoyl, 2-(gamma - L - glutamylamino) - 2 - (N - carboxylmethylcarbamoyl)alkyl and carboxymethoxybenzoylalkyl wherein the benzene ring may be unsubstituted or substituted by one to four X substituents, wherein X is as defined above; with silver nitrate in a basic reaction medium, followed by the treatment of the carboxylate salt intermediate thus formed with an acid to obtain the desired product.

3. The process of claim 2 wherein $R^2$ is lower alkyl.

4. The process of claim 2 wherein $R^2$ is lower alkyl; $X^2$ is hydrogen and $X^3$ is halogen.

5. The process of claim 2 wherein $R^2$ is lower alkyl and $X^2$ and $X^3$ are halogen.

6. The process of claim 2 wherein $R^2$ is lower alkyl and $X^2$ and $X^3$ are lower alkyl radicals.

7. The process of claim 2 wherein $R^2$ is lower alkyl and $X^2$ and $X^3$, taken together, are joined to form a 1,3-butadienylene chain.

8. The process of claim 2 wherein $R^2$ is lower alkyl; $X^2$ is halogen and $X^3$ is lower alkyl.

9. The process of claim 2 wherein $R^2$ is lower alkyl; $X^2$ is lower alkyl and $X^3$ is halogen.

10. The process of claim 2 wherein $R^2$ is trihalomethyl substituted lower alkyl; $X^2$ is hydrogen and $X^3$ is lower alkyl.

11. The process of claim 2 wherein $R^2$ is trihalomethyl substituted lower alkyl and $X^2$ and $X^3$ are lower alkyl radicals.

12. A process for preparing [2,3-dichloro-4-(2-methylene-butyryl)phenoxy]acetic acid which comprises the reaction of [2,3-dichloro-4-[2-methylthiomethyl)butyryl] phenoxy]acetic acid with silver nitrate in the presence of a base, followed by the treatment of the carboxylate salt intermediate thus formed with an acid to obtain the desired product.

13. A process for preparing [2,3-dichloro-4-(2-methylenebutyryl)phenoxy]acetic acid which comprises the reaction of [2,3-dichloro-4-[2-(2-amino-2-carboxyethylthiomethyl)butyryl]phenoxy]acetic acid hydrochloride with silver nitrate in the presence of a base, followed by the treatment of the carboxylate salt intermediate thus formed with an acid to obtain the desired product.

References Cited

UNITED STATES PATENTS 3,230,043   1/1966   Voss et al. _____ 23—146

OTHER REFERENCES

Tarbell et al., Chem. Rev. 49: 24–25 (1951).

Nicolet, J.A.C.S. 53: 3066–67 (1931).

Reid, "Organic Chemistry of Bivalent Sulfur," vol. 2, Chemical Publishing, N.Y., 1960, p. 62.

Houbon-Weyle, "Methoden der Organischen Chemie," 2d Ed., S, Se, Te, pp. 146–7.

LORRAINE A. WEINBERGER, Primary Examiner

D. STENGEL, Assistant Examiner

U.S. Cl. X.R.

260—294, 473, 516, 519, 521, 578, 592, 612 624